No. 844,073. PATENTED FEB. 12, 1907.
L. WOJIDKOW.
HANDLE ATTACHMENT.
APPLICATION FILED APR. 10, 1906.
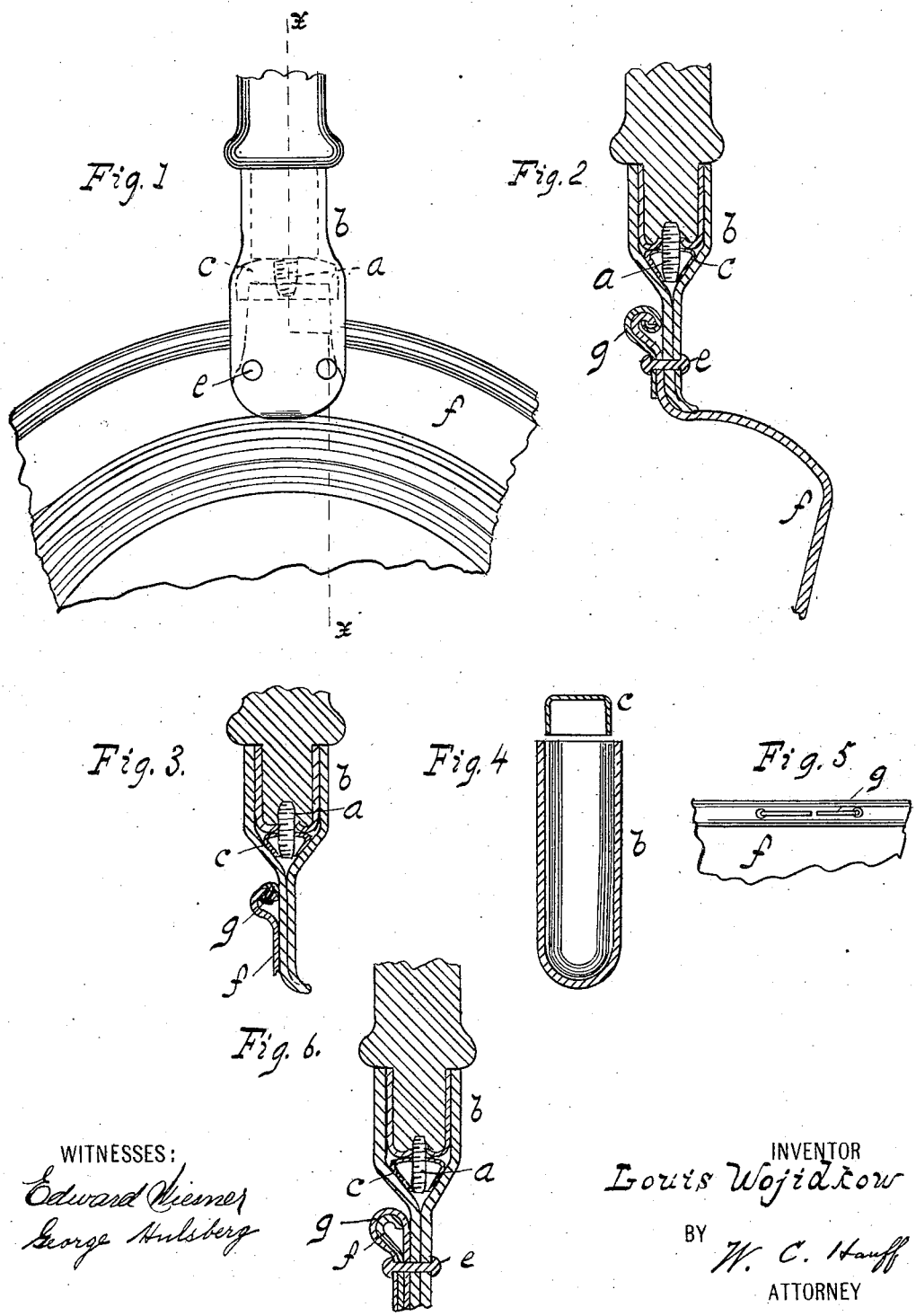
WITNESSES:
Edward Wiener
George Hulsberg
INVENTOR
Louis Wojidkow
BY
W. C. Hauff
ATTORNEY

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

HANDLE ATTACHMENT.

No. 844,073.     Specification of Letters Patent.     Patented Feb. 12, 1907.

Application filed April 10, 1906. Serial No. 310,984.

*To all whom it may concern:*

Be it known that I, LOUIS WOJIDKOW, a citizen of the United States, residing at Brooklyn, in the county of Kings and State of New York, have invented new and useful Improvements in Handle Attachments, of which the following is a specification.

By means of this invention an attachment is obtained serviceable for securing a handle or the like to an enamel utensil or article.

This invention is set forth in the following specification and claims and illustrated in the annexed drawings, in which—

Figure 1 is an inverted plan view of a handle attachment. Fig. 2 is a section along $x\,x$, Fig. 1. Fig. 3 shows a modification in section. Fig. 4 shows a socket and shell before assembling. Fig. 5 shows a manner of applying a soldering-surface. Fig. 6 shows a further modification.

This handle attachment serves for engagement by a handle having a screw-stem $a$, which can be screwed and unscrewed as required.

The attachment is formed as follows: A tube or socket-piece $b$ is drawn up from a suitable blank to the shape shown in Fig. 4. Into this socket-piece is pushed a shell $c$, which can also be drawn or stamped from sheet metal. The socket-piece and shell then are flattened along a certain extent. This flattening or pinching will clamp the socket-piece and shell together, so that they cannot separate. The shell $c$ is suitably tapped or threaded to serve for engagement by the screw-stem $a$. The flat part of socket-piece $b$ is secured by rivets or fastenings $e$ to a utensil $f$, such as a frying-pan, a chafing-dish, or other article. Means for soldering can also be provided. The utensil $f$ prior to enameling is suitably perforated. A soldering piece or strip $g$ can be inserted into these perforations or fastened by rivets or the like. The soldering-piece can be a piece of wire, Fig. 5, or a tin strip, Fig. 2, or any substance that will enable solder to take hold. Such soldering-piece can be connected at the perforations without chipping or affecting the enamel.

The strip $g$ can be secured at one end by rivets $e$ and at the other curled about the bead or edge of the utensil $f$, Fig. 2, or both ends or strip $g$ could be engaged or held clasped by the rivets $e$, Fig. 6.

The soldering piece or face can be secured by the same rivets that secure the handle, Fig. 2, or separately secured in place, as seen in Fig. 5. The handle being secured by the rivets and also soldered to the soldering-piece will be firmly secured.

If the soldering-surface is a wire, as seen in Fig. 5, its end will be held together by the solder which secures the handle.

I claim—

1. In combination with a handle and utensil, of a tube secured to the latter for receiving the handle, and a shell within the tube, a part of said tube being flattened to connect said tube and shell, and the latter having a seat for the engagement of the handle.

2. In combination with a handle and utensil, of a tube and shell within the latter, said tube being flattened at the part containing the shell to secure the same and left tubular at the remaining part so as to inclose the shell, said shell having a perforation for affixing the handle thereto.

3. In combination with a handle and a utensil, of an attachment comprising a tube secured to the utensil and a shell in said tube at the portion where the same is secured to the utensil, said part of the tube with inclosed shell being flattened to form a suitable face for securing the same to the utensil, and the remaining portion of the tube being left unflattened to prevent withdrawal of the flattened shell, said shell having a perforation for the insertion of the handle.

4. A handle attachment of a utensil, comprising a handle, a tube for receiving the handle and a shell in said tube at the portion where the tube is to be secured to the utensil, said part of the tube with inclosed shell being flattened to form a suitable face for securing the handle attachment to the utensil and the remaining portion of the tube being left unflattened to prevent withdrawal of the flattened shell, said shell having a perforation for affixing the handle thereto.

In testimony whereof I have hereunto set my hand in the presence of two subscribing witnesses.

LOUIS WOJIDKOW.

Witnesses:
   EDWARD WIESNER,
   GEORGE HULSBERG.